US012278040B2

(12) United States Patent
Hasegawa et al.

(10) Patent No.: US 12,278,040 B2

(45) Date of Patent: Apr. 15, 2025

(54) INDUCTOR COMPONENT AND METHOD FOR MANUFACTURING THE SAME

(71) Applicant: Murata Manufacturing Co., Ltd., Kyoto-fu (JP)

(72) Inventors: Shin Hasegawa, Nagaokakyo (JP); Tatsuya Sasaki, Nagaokakyo (JP); Shinya Hirai, Nagaokakyo (JP); Ikuno Sugiyama, Nagaokakyo (JP); Toshimitsu Tamura, Nagaokakyo (JP)

(73) Assignee: Murata Manufacturing Co., Ltd., Kyoto-fu (JP)

( * ) Notice: Subject to any disclaimer, the term of this patent is extended or adjusted under 35 U.S.C. 154(b) by 1024 days.

(21) Appl. No.: 17/179,391

(22) Filed: Feb. 18, 2021

(65) Prior Publication Data

US 2021/0257155 A1 Aug. 19, 2021

(30) Foreign Application Priority Data

Feb. 19, 2020 (JP) ................................ 2020-026342

(51) Int. Cl.

*H01F 27/28* (2006.01)
*H01F 27/24* (2006.01)
*H01F 27/29* (2006.01)
*H01F 41/02* (2006.01)
*H01F 41/04* (2006.01)

(52) U.S. Cl.

CPC ............ *H01F 27/29* (2013.01); *H01F 27/24* (2013.01); *H01F 27/2823* (2013.01); *H01F 41/0206* (2013.01); *H01F 41/04* (2013.01)

(58) Field of Classification Search

CPC ...... H01F 27/29; H01F 27/24; H01F 27/2823; H01F 41/0206; H01F 41/04; H01F 17/06; H01F 27/2895; H01F 27/303; H01F 27/306; H01F 17/062; H01F 27/28

See application file for complete search history.

(56) References Cited

U.S. PATENT DOCUMENTS

2016/0314895 A1* 10/2016 Shiokawa ........... H01F 27/2895
2016/0351322 A1* 12/2016 Banba ..................... H01F 17/04

(Continued)

FOREIGN PATENT DOCUMENTS

CN 108701540 A 10/2018
CN 108735435 A 11/2018

(Continued)

*Primary Examiner* — Mang Tin Bik Lian

(74) *Attorney, Agent, or Firm* — Studebaker Brackett PLLC

(57) ABSTRACT

An inductor component and a method for manufacturing an inductor component that enables the inductor component to be miniaturized. An inductor component includes an annular core; and a coil including a plurality of pin members and wound on the core with neighboring pin members connected to each other. A first pin member and a second pin member both adjacent to each other have a welded part in which an end face of an end part of the first pin member and a peripheral surface of an end part of the second pin member are welded to each other. A width of a part, of the first pin member, except the welded part is smaller, as viewed from a direction along a center line of the end part of the second pin member, than a width of a part, of the second pin member, except the welded part.

19 Claims, 7 Drawing Sheets

(56) References Cited

U.S. PATENT DOCUMENTS

| | | | | |
|---|---|---|---|---|
| 2017/0004914 | A1* | 1/2017 | Nishide | H01F 27/24 |
| 2021/0217550 | A1* | 7/2021 | Hundt | H01F 17/062 |

FOREIGN PATENT DOCUMENTS

| | | | | |
|---|---|---|---|---|
| JP | S50-020152 | U1 | | 3/1975 |
| JP | H06-011316 | A | | 1/1994 |
| JP | 06302437 | A | * | 10/1994 |
| JP | H10-041140 | A | | 2/1998 |
| JP | 2013-093388 | A | | 5/2013 |
| JP | 2016051765 | A | * | 4/2016 |
| JP | 2018-182227 | A | | 11/2018 |
| JP | 2021-132107 | A | | 9/2021 |
| WO | 2017/141838 | A1 | | 8/2017 |

* cited by examiner

INDUCTOR COMPONENT AND METHOD FOR MANUFACTURING THE SAME

CROSS-REFERENCE TO RELATED APPLICATION

This application claims benefit of priority to Japanese Patent Application No. 2020-026342, filed Feb. 19, 2020, the entire content of which is incorporated herein by reference.

BACKGROUND

Technical Field

The present disclosure relates to an inductor component and a method for manufacturing the inductor component.

Background Art

Conventionally, an inductor component is described in Unexamined Utility Model Specification S50-20152 U1. This inductor component includes an annular core and a coil wound on the core. The coil includes a first wire member having a square-cornered U-shape; and a second wire member having a straight line shape, wherein an end part of the first wire member and an end part of the second wire member are connected to constitute one turn of a coil.

SUMMARY

The inventors of the present application have found that when the end part of the first wire member and the end part of the second wire member are welded to form a welded part in the inductor component of the above conventional inductor component, a gap between the neighboring turns of the coil matters as miniaturization of the inductor component progresses. Specifically, there is a problem that when the first and second wire members are laser-welded to form a welded part, the welded part projects in the gap between the neighboring turns of the coil. This makes it difficult to make the size of the coil small by narrowing the gaps between the neighboring turns of the coil.

To address this issue, the present disclosure provides an inductor component that can be miniaturized, and provides a method for manufacturing the inductor component.

Accordingly, an inductor component that is an aspect of the present disclosure includes an annular core; and a coil including a plurality of pin members and wound on the core with neighboring pin members, of the plurality of pin members, connected to each other. A first pin member and a second pin member of the neighboring pin members have a welded part in which an end face of an end part of the first pin member and a peripheral surface of an end part of the second pin member are welded to each other. A width of a part, of the first pin member, except the welded part is smaller, as viewed from a direction along a center line of the end part of the second pin member, than a width of a part, of the second pin member, except the welded part.

Here, the width represents the width in a direction orthogonal to a first plane containing a center line of the end part of the first pin member and a center line of the end part of the second pin member. The end part of the first and second pin members each refer to a part on which the welded part is provided.

According to the above aspect, the width of the part, of the first pin member, except the welded part is smaller than the width of the part, of the second pin member, except the welded part; therefore, it is possible to prevent the width of the welded part from becoming too large. With the above arrangement, the welded part can be formed to have a smaller width than a welded part formed with a first pin member and a second pin member having the same diameter, it is therefore possible to make the gaps between the neighboring turns of the coil small, so that the inductor component can be miniaturized.

Preferably, in an embodiment of the inductor component, a cross-sectional area of the part, of the first pin member, except the welded part is equal to a cross-sectional area of the part, of the second pin member, except the welded part.

Here, the cross-sectional area of each of the first and second pin members is the average cross-sectional area on a plane orthogonal to an extending direction of the respective first and second pin members.

According to the above embodiment, the cross-sectional area of the part, of the first pin member, except the welded part is equal to the cross-sectional area of the part, of the second pin member, except the welded part; therefore, even if the width of the part, of the first pin member, except the welded part is made to have a small width, it is possible to prevent or reduce an increase in resistance of this part.

Preferably, an embodiment of the inductor component further includes a coating member that covers the first pin member.

With the above embodiment, since the width of the first pin members is small, bubbles generated when the coating member is applied to the first pin members easily pass through the gaps between the first pin members of the neighboring turns of the coil, so that it is possible to prevent or reduce residual babbles in the coating member.

Preferably, in an embodiment of the inductor component, the welded part is not provided on an outer side edge of the second pin member as viewed from a direction orthogonal to a first plane containing a center line of the end part of the first pin member and the center line of the end part of the second pin member.

Here, the outer side edge of the second pin member refers to an outer side edge opposite to the end part of the first pin member (inner side) as viewed from the direction orthogonal to the first plane.

According to the above embodiment, the welded part is not provided on the outer side edge of the second pin member. This configuration can reduce a surface tension directed to the outer side edge of the second pin member when the welded part is melted, so that the welded part does not make such a spherical shape that covers the outer side edge. Therefore, the welded part can be made smaller, and the gap between the neighboring turns of the coil can be made smaller, whereby the inductor component can be miniaturized. In addition, it is possible to reduce protrusion of the welded part beyond the outer side edge of the second pin member, and an outer shape of the coil can be made small.

Preferably, in an embodiment of the inductor component, the welded part is provided, as viewed from a direction along the center line of the end part of the second pin member, on an inner side with respect to a second plane that contains the center line of the end part of the second pin member and is orthogonal to the first plane.

Here, the inner side with respect to the second plane refers to the first pin member's end part side with respect to the second plane as viewed from a direction along the center line of the end part of the second pin member.

According to the above embodiment, the welded part is provided on the inner side with respect to the second plane; therefore, the welded part can be made smaller, and the gaps between the neighboring turns of the coil can be made smaller, so that the inductor component can be miniaturized.

Preferably, in an embodiment of the inductor component, the welded part has a constricted part whose width is narrower as viewed from a direction along the center line of the end part of the second pin member.

Here, the width represents the width in the direction orthogonal to the first plane.

According to the above embodiment, the welded part has the constricted part; therefore, it is possible to reduce protrusion of the welded part in the gap between the neighboring turns of the coil, and the gaps between the neighboring turns of the coil can be made smaller, so that the inductor component can be miniaturized.

Preferably, an embodiment of a method for manufacturing an inductor component is a method for manufacturing an inductor component including an annular core and a coil that includes a plurality of pin members and is wound on the core with neighboring pin members, of the plurality of pin members, connected to each other, and the method includes disposing the plurality of pin members on the core in a state where an end face of an end part of a first pin member and a peripheral surface of an end part of a second pin member are in contact with each other and in a state where a width of the end part of the first pin member is smaller, as viewed from a direction along a center line of the end part of the second pin member, than a width of the end part of the second pin member, wherein the first pin member and the second pin member are adjacent to each other; and forming a welded part by welding the end face of the end part of the first pin member and the peripheral surface of the end part of the second pin member to each other by heating the first pin member and the second pin member.

According to the above embodiment, the plurality of pin members are disposed on the core in the state where the width of the end part of the first pin member is smaller, as viewed from the direction along the center line of the end part of the second pin member, than the width of the end part of the second pin member, and the end face of the end part of the first pin member and the peripheral surface of the end part of the second pin member are welded to each other to form the welded part; therefore, the welded part can be formed to have a smaller width than a welded part formed with a first pin member and a second pin member both having the same diameter. As a result, the gaps between the neighboring turns of the coil can be made small, so that the inductor component can be miniaturized.

With the inductor component and the method for manufacturing the inductor component that are each an aspect of the present disclosure, miniaturization can be achieved.

DETAILED DESCRIPTION

Figure 1:
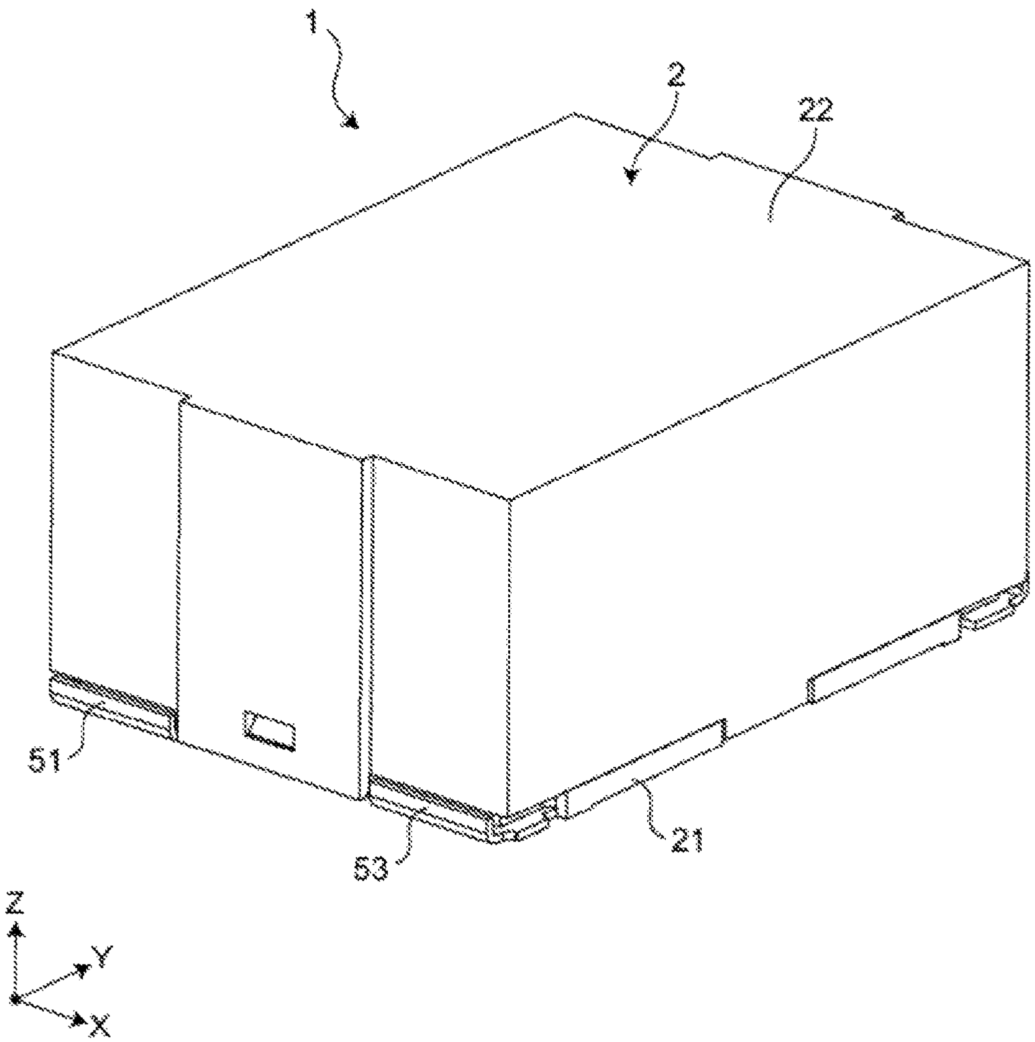
FIG. 1 is an upward perspective view showing an inductor component of a first embodiment of the present disclosure.

In the following, an inductor component of an aspect of the present disclosure will be described in more detail with reference to embodiments illustrated in the drawings. Note that some drawings include schematic representations and do not represent actual dimensions or ratios in some cases.

First Embodiment

Figure 2:
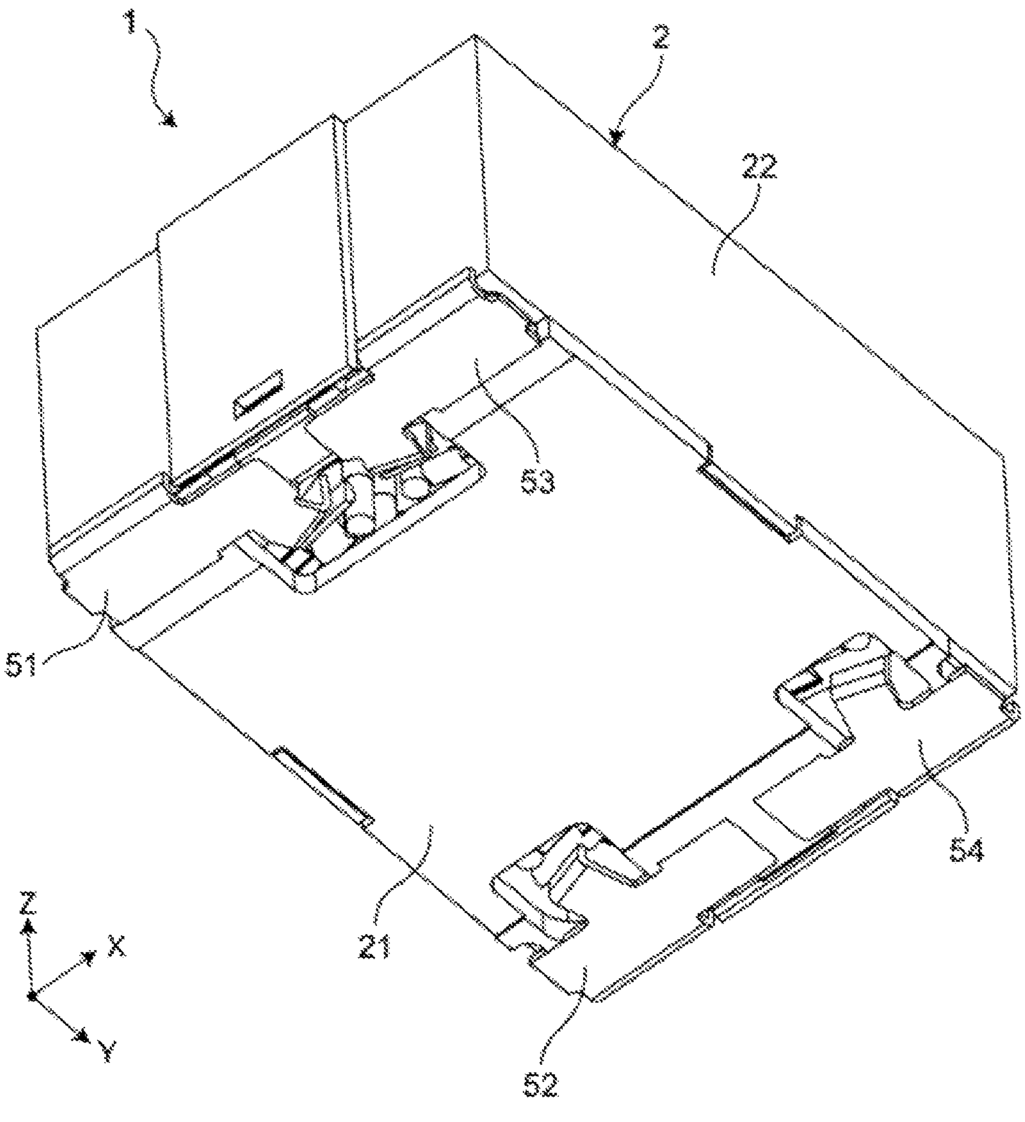
FIG. 2 is a downward perspective view of the inductor component.
Figure 3:
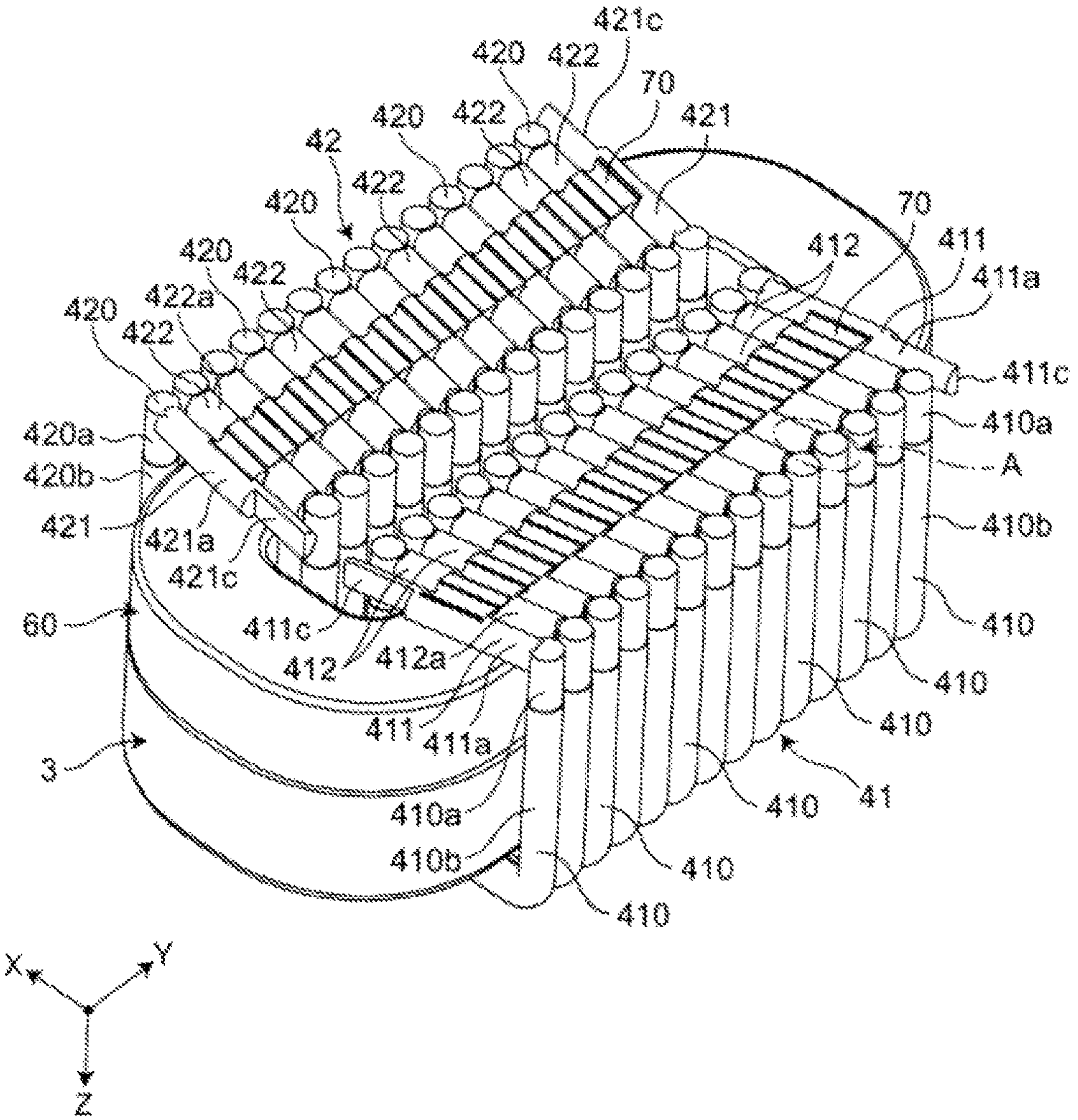
FIG. 3 is a downward perspective view showing the inside of the inductor component.
Figure 4:
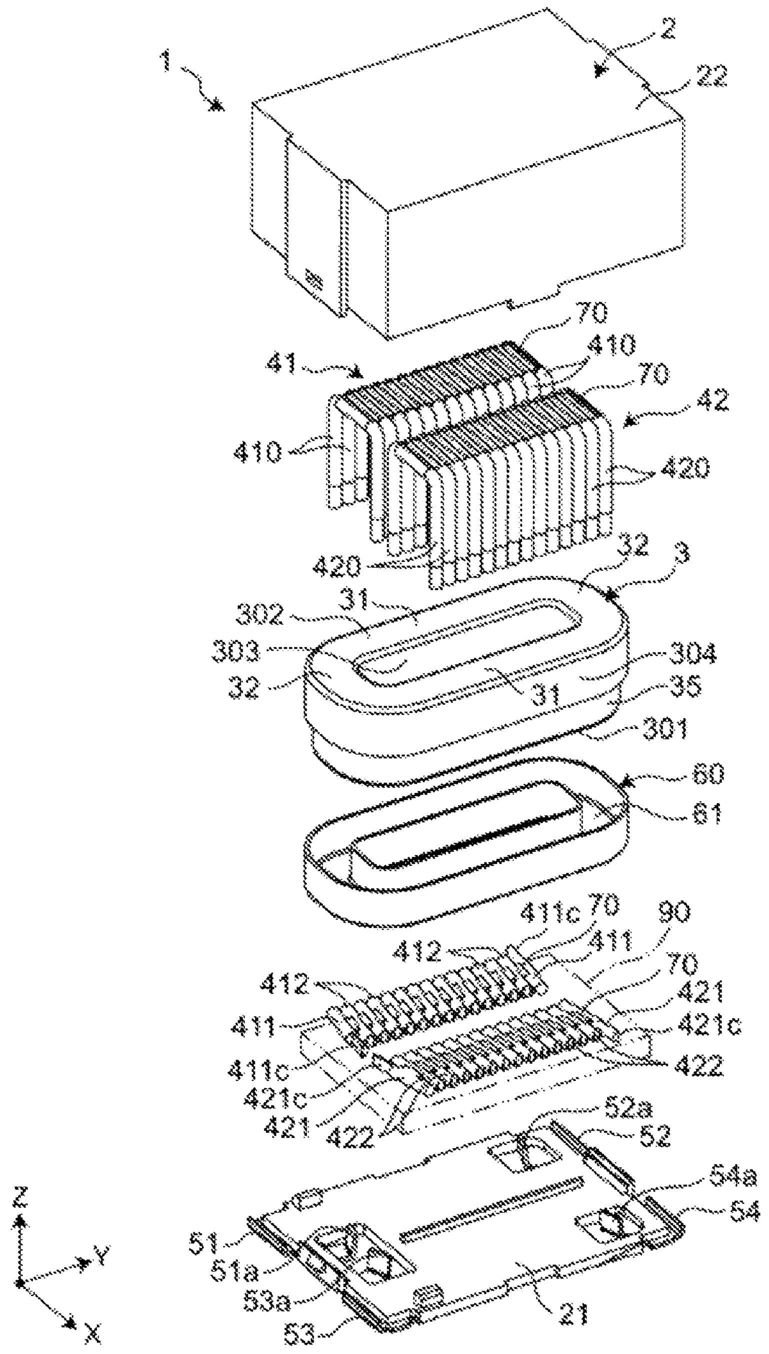
FIG. 4 is an exploded perspective view of the inductor component.

Configuration of an inductor component FIG. 1 is an upward perspective view showing an inductor component of an embodiment of the present disclosure. FIG. 2 is a downward perspective view of the inductor component. FIG. 3 is a downward perspective view showing the inside of the inductor component. FIG. 4 is an exploded perspective view of the inductor component.

As shown in FIGS. 1 to 4, an inductor component 1 has a case 2; an annular core 3 housed in the case 2; a first coil 41 and a second coil 42 wound on the core 3; and a first to fourth electrode terminals 51 to 54 attached to the case 2 and connected to the first coil 41 and the second coil 42. The inductor component 1 is, for example, a common mode choke coil or the like.

The case 2 has a bottom plate part 21 and a box-shaped lid part 22 covering the bottom plate part 21. The case 2 is configured with a material having strength and heat resistance and is preferably configured with a flame-resistant material. The case 2 is configured with, for example, a resin such as PPS (polyphenylenesulfide), LCP (liquid crystal polymer), or PPA (polyphthalamide), or ceramic. The core 3 is placed on the bottom plate part 21 with a central axis of the core 3 aligned orthogonal to the bottom plate part 21. The central axis of the core 3 refers to a central axis of an inner diameter hole of the core 3. A shape of the case 2 (bottom plate part 21 and lid part 22) is a rectangle as viewed from a central-axis direction of the core 3. In the present embodiment, the shape of the case 2 is an oblong rectangle.

Here, the short-side direction of the case 2 viewed from the central-axis direction of the core 3 is assumed as the X direction, the long-side direction of the case 2 viewed from the central-axis direction of the core 3 is assumed as the Y direction, and a height direction of the case 2, which is the direction perpendicular to the X direction and the Y direction, is assumed as the Z direction. The bottom plate part 21 and the lid part 22 of the case 2 are disposed to face each other in the Z direction. The bottom plate part 21 is located on the lower side, and the lid part 22 is located on the upper side. The upper side and the lower side in the Z direction are respectively assumed as the forward direction in the Z direction and the reverse direction in the Z direction. Note that when the shape of the bottom plate part 21 of the case 2 is a square, an X direction length of the case 2 and a Y direction length of the case 2 are the same.

The first to fourth electrode terminals 51 to 54 are attached on the bottom plate part 21. The first electrode terminal 51 and the second electrode terminal 52 are on two corners, of the bottom plate part 21, facing each other in the Y direction, and the third electrode terminal 53 and the fourth electrode terminal 54 are on two corners, of the bottom plate part 21, facing each other in the Y direction.

The first electrode terminal 51 and the third electrode terminal 53 face each other in the X direction, and the second electrode terminal 52 and the fourth electrode terminal 54 face each other in the X direction.

The core 3 has an oval shape (track shape) as viewed from the central-axis direction. The core 3 includes a pair of long-side parts 31 that extend in the long axis as viewed from the central-axis direction and face each other in the short-axis direction; and a pair of short-side parts 32 that extend along the short axis and face each other in the long-axis direction. Note that the core 3 may have an oblong rectangle or an oval shape as viewed from the central-axis direction.

The core 3 is configured, for example, with a ceramic core such as ferrite or with a magnetic core that is made by powder molding of iron-based material or is made of nanocrystal foils. The core 3 has a first end face 301 and a second end face 302 that face each other in the central-axis direction; an inner peripheral surface 303; and an outer peripheral surface 304. The first end face 301 is a lower-side end face of the core 3 and faces an inner surface of the bottom plate part 21. The second end face 302 is an upper-side end face of the core 3 and faces an inner surface of the lid part 22. The core 3 is housed in the case 2 such that the long-axis direction of the core 3 coincides with the Y direction.

A cross-section of the core 3 orthogonal to a circumferential direction of the core 3 has a rectangular shape. The first end face 301 and the second end face 302 are disposed perpendicular to the central-axis direction of the core 3. The inner peripheral surface 303 and the outer peripheral surface 304 are disposed parallel to the central-axis direction of the core 3. In this specification, the term "perpendicular" does not only mean "being perfectly perpendicular" but includes "being substantially perpendicular". Further, the term "parallel" does not only mean "being perfectly parallel" but includes "being substantially parallel".

The lower part of the core 3 is covered with an insulation member 60. The insulation member 60 is configured with, for example, super engineering plastic such as LCP, PPA, or PPS, and this configuration improves heat resistance, insulation properties, and workability of the insulation member 60.

The insulation member 60 has a recessed annular part 61 that is formed in an annular shape to cover the lower part of the core 3. As described above, by fitting the lower part of the core 3 in the recessed annular part 61 of the insulation member 60, the insulation member 60 can be mounted on the core 3.

The core 3 has a fitting groove 35 in which the insulation member 60 is fit. The fitting groove 35 is opened to the first end face 301, the inner peripheral surface 303, and the outer peripheral surface 304 of the core 3. Since an outer peripheral surface of the insulation member 60 is fit in the fitting groove 35 of the core 3, it is possible to reduce protrusion of the insulation member 60 from an outer surface of the core 3. Further, the insulation member 60 can be easily attached, and, in addition, the insulation member 60 can be prevented from being displaced.

The first coil 41 is wound on the core 3 and the insulation member 60, between the first electrode terminal 51 and the second electrode terminal 52. One end of the first coil 41 is connected to the first electrode terminal 51.

The other end of the first coil 41 is connected to the second electrode terminal 52.

The second coil 42 is wound on the core 3 and the insulation member 60, between the third electrode terminal 53 and the fourth electrode terminal 54. One end of the second coil 42 is connected to the third electrode terminal 53.

The other end of the second coil 42 is connected to the fourth electrode terminal 54.

The first coil 41 and the second coil 42 are wound along the long-axis direction. Specifically, the first coil 41 is wound on one of the long-side parts 31 of the core 3, and the second coil 42 is wound on the other of the long-side parts 31 of the core 3. A winding axis of the first coil 41 and a winding axis of the second coil 42 run parallel to each other. The first coil 41 and the second coil 42 are symmetrical with each other about the long axis of the core 3.

A winding number of the first coil 41 and a winding number of the second coil 42 are the same. A winding direction of the first coil 41 with respect to the core 3 is opposite to a winding direction of the second coil 42 with respect to the core 3.

In other words, the winding direction of the first coil 41 from the first electrode terminal 51 toward the second electrode terminal 52 is opposite to the winding direction of the second coil 42 from the third electrode terminal 53 toward the fourth electrode terminal 54.

A common mode current flows in the first coil 41 from the first electrode terminal 51 toward the second electrode terminal 52, and a common mode current flows in the second coil 42 from the third electrode terminal 53 to the fourth electrode terminal 54. In other words, the first to fourth electrode terminals 51 to 54 are connected in such a manner that a common mode current flows in the same direction. When a common mode current flows through the first coil 41, a first magnetic flux is generated in the core 3 by the first coil 41. When a common mode current flows through the second coil 42, a second magnetic flux is generated in the core 3 in such a direction that the second magnetic flux and the first magnetic flux strengthen each other in the core 3. Therefore, the first coil 41 and the core 3 and the second coil 42 and the core 3 function as an inductance component, and noises are therefore removed from the common mode current.

The first coil 41 is configured with a plurality of pin members connected by welding such as laser welding or spot welding. Note that FIG. 3 does not show a state where a plurality of pin members are actually welded but shows a state where the plurality of pin members are just assembled.

The plurality of pin members are not printed wires or conductive wires but bar-shaped members. The pin members have stiffness and are more difficult to bend than conductive wires for connection between electronic component modules.

The plurality of pin members are not printed wires or conductive wires but bar-shaped members. The pin members have stiffness and are more difficult to bend than conductive wires for connection between electronic component modules. Specifically, each pin member is shorter than the length of one circumference passing through, in the circumferential direction, the first end face 301, the second end face 302, and the inner peripheral surface 303, and the outer peripheral surface 304 of the core 3. The pin member has high stiffness and is therefore difficult to bend.

The plurality of pin members include flexion pin members 410 bent in an approximate U-shape and straight pin members 411 and 412 extended in an approximate straight line shape (approximate I-shape). In the present embodiment, the flexion pin members 410 correspond to "second pin members" described in the claims, and the straight pin members 411 and 412 correspond to "first pin members" described in the claims.

Figure 5:
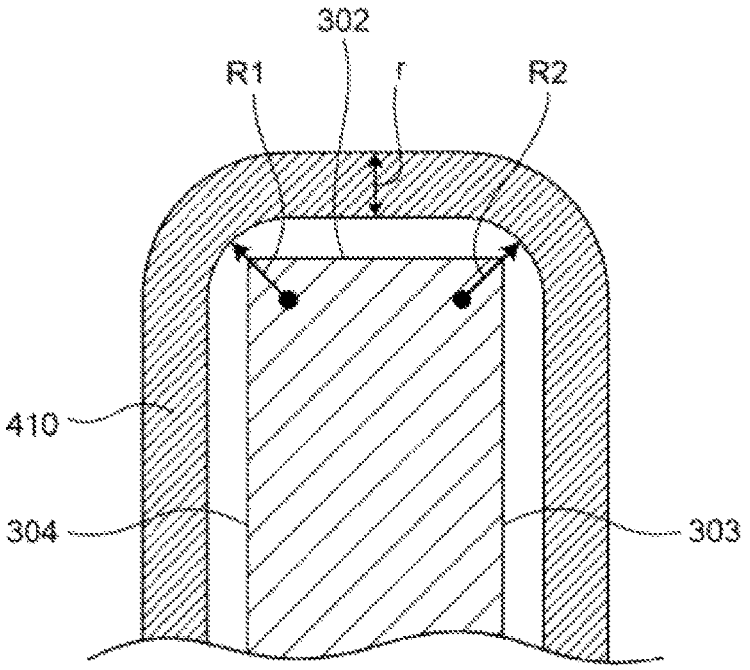
FIG. 5 is a cross-sectional view of the inductor component.

The first coil 41 includes, in order from one end to the other end: a first straight pin member 411 on one end side (first end); a plurality sets of a flexion pin member 410 and a second straight pin member 412; and a first straight pin member 411 on the other end side (second end). The first straight pin member 411 and the second straight pin member 412 have different lengths. A spring index of the flexion pin member 410 is described as follows. When the flexion pin member 410 wound on the second end face 302, the inner peripheral surface 303, and the outer peripheral surface 304 of the core 3 as shown in FIG. 5, a spring index Ks of the flexion pin member 410 is smaller than 3.6 for the following radiuses of curvature: a radius of curvature R1 of a part, of the flexion pin member 410, located at a corner part of the outer peripheral surface 304 of the core 3; and a radius of curvature R2 of a part, of the flexion pin member 410, located at a corner part of the inner peripheral surface 303 of the core 3. The spring index Ks is expressed by a formula: (radius of curvature R1 or R2)/(wire diameter r of flexion pin member). As described above, the flexion pin member 410 has high stiffness and is difficult to bend.

The flexion pin members 410 and the second straight pin members 412 are alternately welded by welding such as laser welding or spot welding. One end of a second straight pin member 412 is connected to one end of a flexion pin member 410, and the other end of the second straight pin member 412 is connected to one end of another flexion pin member 410. By repeating the above steps, the plurality of flexion pin members 410 and second straight pin members 412 are connected, and the plurality of connected flexion pin members 410 and second straight pin members 412 are wound in a spiral shape on the core 3. That is, a set of a flexion pin member 410 and a second straight pin member 412 constitute a unit element of one turn.

Each flexion pin member 410 is disposed along and parallel to each surface of the second end face 302, the inner peripheral surface 303, and the outer peripheral surface 304 of the core 3. Each second straight pin member 412 is disposed along and parallel to the first end face 301 of the core 3. Each first straight pin member 411 is disposed along and parallel to the first end face 301 of the core 3.

The neighboring flexion pin members 410 are fixed with an adhesive member 70. This arrangement enables the plurality of flexion pin members 410 to be stably attached to the core 3. Similarly, the neighboring first straight pin member 411 and second straight pin member 412 are fixed with the adhesive member 70, and the neighboring second straight pin members 412 are fixed with the adhesive member 70. This arrangement enables the plurality of first straight pin member 411 and second straight pin members 412 to be stably attached to the core 3.

The first electrode terminal 51 is connected to one end of the first straight pin member 411 at the first end, and the other end of the first straight pin member 411 at the first end is connected to one end of the flexion pin member 410 adjacent to the first straight pin member 411 at the first end. The one end of the first straight pin member 411 at the first end has an attaching piece 411*c*. The first electrode terminal 51 has an attaching part 51*a* positioned inside the case 2. The attaching piece 411*c* of the first straight pin member 411 at the first end is connected to the attaching part 51*a* of the first electrode terminal 51.

The second electrode terminal 52 is connected to one end of the first straight pin member 411 at the second end, and the other end of the first straight pin member 411 at the second end is connected to one end of the second straight pin member 412 adjacent to the first straight pin member 411 at the second end. The attaching piece 411*c* on the one end of the first straight pin member 411 at the second end is connected to an attaching part 52*a* of the second electrode terminal 52.

The second coil 42 is configured with a plurality of pin members in a similar manner to the first coil 41. Specifically, the second coil 42 includes, in order from one end to the other end: a first straight pin member 421 on one end side (first end); a plurality sets of a flexion pin member 420 and a second straight pin member 422; and a first straight pin member 421 on the other end side (second end). The flexion pin members 420 and the second straight pin member 422 are alternately connected to each other and are wound on the core 3. Specifically, the plurality of flexion pin members 420 and second straight pin members 422 are connected, and the plurality of connected flexion pin members 420 and second straight pin members 422 are wound in a spiral shape on the core 3.

The third electrode terminal 53 is connected to one end of the first straight pin member 421 at the first end, and the other end of the first straight pin member 421 at the first end is connected to one end of the flexion pin member 420 adjacent to the first straight pin member 421 at the first end. The attaching piece 421*c* on the one end of the first straight pin member 421 at the first end is connected to an attaching part 53*a* of the third electrode terminal 53.

The fourth electrode terminal 54 is connected to one end of the first straight pin member 421 at the second end, and the other end of first straight pin member 421 at the second end is connected to one end of the second straight pin member 412 adjacent to the first straight pin member 421 at the second end. The attaching piece 421*c* on the one end of the first straight pin member 421 at the second end is connected to an attaching part 54*a* of the fourth electrode terminal 54.

As shown in FIG. 3, the first coil 41 and the second coil 42 (pin members 410 to 412 and 420 to 422) each include conductor parts and coating films covering the conductor parts. The conductor parts are made of copper wires, for example, and the coating films are made of polyamideimide resin, for example. The coating films have a thickness of, for example, 0.02 mm to 0.04 mm.

The first straight pin members 411 and 421 are respectively configured with conductor parts 411*a* and 421*a* having no coating film. The second straight pin members 412 and 422 are configured with conductor parts 412*a* and 422*a* having no coating film. The flexion pin members 410 and 420 are configured with conductor parts 410*a* and 420*a* and with coating film 410*b* and 420*b*.

On one ends and the other ends of the flexion pin members 410 and 420, the conductor parts 410*a* and 420*a* are exposed from the coating film 410*b* and 420*b*. Specifically, the first straight pin members 411 and 421, the second straight pin members 412 and 422, and the flexion pin members 410 and 420 are mutually welded at the exposed conductor parts 411*a*, 421*a*, 412*a*, 422*a*, 410*a*, and 420*a*.

Figure 6A:
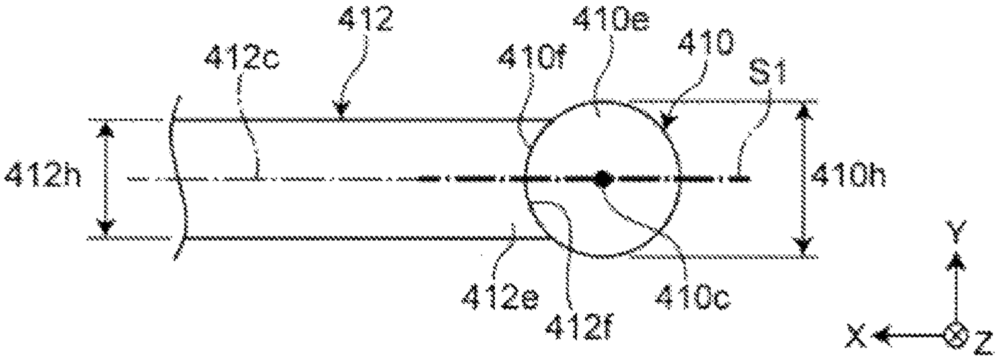
FIG. 6A is an enlarged view of part A in FIG. 3.

FIG. 6A is an enlarged view of part A in FIG. 3 and is a bottom view as viewed from below in the Z direction. FIG. 6A does not show a state where the flexion pin member 410 and the second straight pin member 412 are actually welded but shows a state where the flexion pin member 410 and the second straight pin member 412 are just assembled. As shown in FIG. 6A, an end face 412*f* of an end part 412*e* of the second straight pin member 412 and a peripheral surface 410*f* of an end part 410*e* of the flexion pin member 410 are in contact with each other.

The flexion pin member 410 and the second straight pin member 412 each have a circular cylinder shape. That is, the cross-sectional shapes of the flexion pin member 410 and the second straight pin member 412 each have a circular shape. The cross-section of the flexion pin member 410 represents the cross-section, of the flexion pin member 410, on a plane orthogonal to the direction in which the flexion pin member 410 extends, and the cross-section of the second straight pin member 412 represents a cross-section, of the second straight pin member 412, on a plane orthogonal to the direction in which the second straight pin member 412 extends.

The end part 410*e* of the flexion pin member 410 and the end part 412*e* of the second straight pin member 412 are parts on which the flexion pin member 410 and the second straight pin member 412 are mutually welded. The end face 412*f* of the end part 412*e* of the second straight pin member 412 is a concave curved surface and is a shape corresponding to the peripheral surface 410*f* of the end part 410*e* of the flexion pin member 410.

As viewed from the direction along a center line 410*c* of the end part 410*e* of the flexion pin member 410 (hereinafter, the direction is referred to as the Z direction), a width 412*h* of the second straight pin member 412 is smaller than a width 410*h* of the flexion pin member 410. Here, the width represents the width in the direction orthogonal to a first plane S1 containing a center line 412*c* of the end part 412*e* of the second straight pin member 412 and the center line 410*c* of the end part 410*e* of the flexion pin member 410. In the present embodiment, a diameter of the second straight pin member 412 is smaller than a diameter of the flexion pin member 410.

The center line 410*c* of the end part 410*e* of the flexion pin member 410 refers to the center line 410*c* of a part containing the end part 410*e* of the flexion pin member 410. That is, because the flexion pin member 410 has an approximate U-shape, the center line of the flexion pin member 410 extends in different directions, depending on positions. Therefore, the center line 410*c* of the end part 410*e* of the flexion pin member 410 is assumed as the center line 410*c*. Similarly, the center line 412*c* of the end part 412*e* of the second straight pin member 412 is define by the center line 412*c* of a part containing the end part 412*e* of the second straight pin member 412.

Figure 6B:
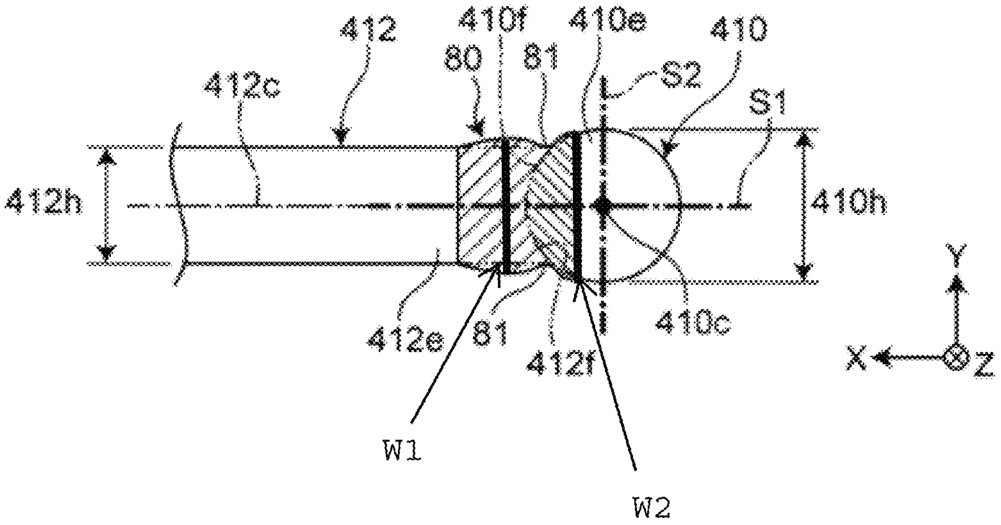
FIG. 6B is a bottom view as viewed from the Z direction that shows how a flexion pin member and a second straight pin member of FIG. 6A are welded.

FIG. 6B shows a state where the flexion pin member 410 and the second straight pin member 412 of FIG. 6A are actually welded. As shown in FIG. 6B, the neighboring second straight pin member 412 and flexion pin member 410 have a welded part 80 where the end part 412*e* of the second straight pin member 412 and the end part 410*e* of the flexion pin member 410 are mutually welded. Specifically, the welded part 80 is configured by the end face 412*f* of the end part 412*e* of the second straight pin member 412 and the peripheral surface 410*f* of the end part 410*e* of the flexion pin member 410 welded to each other. For convenience, the welded part 80 is shown by hatching. Since the welded part 80 is formed, the end face 412*f* of the second straight pin member 412 and the peripheral surface 410*f* of the flexion pin member 410 are formed into one body with no boundary between the end face 412*f* and the peripheral surface 410*f*. The end face 412*f* and the peripheral surface 410*f* before welding is shown by an imaginary line.

Since the welded part 80 is formed of metal that once became liquid and then was solidified, liquid-state metal was mixed, so that there is no orientation in metal crystals in the welded part 80. On the other hand, since the metal of the parts, of the pin members 410 and 412, other than the welded part 80 was not melted, and metal crystals in these parts have orientations. For this reason, it is possible to identify, visually or by cross-sectional polishing, the difference between the welded part 80 and the parts, of the pin members 410 and 412, except the welded part 80.

The end part 410*e* of the flexion pin member 410 has constricted parts 81, where the width is narrower. Specifically, the welded part 80 has constricted parts 81, where the width is narrower as viewed from the Z direction. Each constricted part 81 is provided at a position where the end face 412*f* of the second straight pin member 412 and the peripheral surface 410*f* of the flexion pin member 410 intersect each other as viewed from the Z direction. Specifically, the constricted parts 81 are provided at a central position, of the welded part 80, in the X direction and at positions on both sides, of the welded part 80, in the Y direction.

Note that the above description is applied also to the welded part formed between the neighboring first straight pin member 411 and flexion pin member 410. Further, the above description is applied also to the second coil 42. Specifically, the above description is applied also to the welded parts formed between the neighboring first straight pin members 421 and flexion pin members 420 and the welded parts formed between the neighboring second straight pin members 422 and flexion pin members 420. The same thing goes for the following descriptions.

Figure 6C:
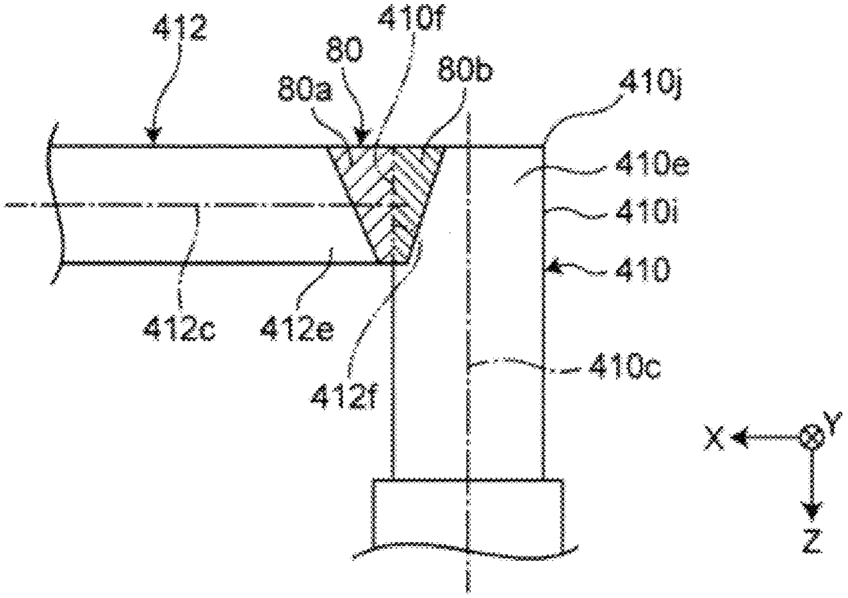
FIG. 6C is a side view as viewed from the Y direction of FIG. 6B.

FIG. 6C is a view as viewed from the Y direction of FIG. 6B. As shown in FIGS. 6B and 6C, the welded part 80 is not provided on an outer side edge 410*i* of the flexion pin member 410 as viewed from the direction orthogonal to the first plane S1 (hereinafter, the direction is referred to as the Y direction).

Here, the outer side edge 410*i* of the flexion pin member 410 refers to the outer side edge opposite to the end part 412*e* of the second straight pin member 412 (which is on the inner side) as viewed from the Y direction. Since the flexion pin member 410 has a circular cylinder shape, the outer side edge 410*i* of the flexion pin member 410 represents a line. Note that when the flexion pin member 410 has a prismatic column shape, the outer side edge 410*i* of the flexion pin member 410 represents a surface.

With the above arrangement, the welded part 80 is not provided on the outer side edge 410*i* of the flexion pin member 410; therefore, a surface tension directed toward the outer side edge 410*i* of the flexion pin member 410 is prevented or reduced, the welded part 80 therefore does not form such a spherical shape that covers the outer side edge 410*i*. Therefore, the welded part 80 can be made smaller, and the gap between the neighboring turns of the first coil 41 can be made smaller, so that the inductor component 1 can be miniaturized. In addition, it is possible to reduce protrusion of the welded part 80 beyond the outer side edge 410*i* of the flexion pin member 410, and an outer shape of the first coil 41 can be made small.

The welded part 80 is provided on the inner side with respect a second plane S2 that contains the center line 410*c* of the end part 410*e* of the flexion pin member 410 and is orthogonal to the first plane S1, as viewed from the Z direction. Here, the inner side with respect to the second plane S2 refers to the end part 412*e* side of the second straight pin member 412 with respect to the second plane S2, as viewed from the Z direction.

With this arrangement, the welded part 80 is provided on the inner side with respect to the second plane S2; therefore, the welded part 80 can be made smaller, and the gaps between the neighboring turns of the first coil 41 can be made smaller, so that the inductor component 1 can be miniaturized.

As viewed from the Z direction, the width 412*h* of the part, of the second straight pin member 412, except the welded part 80 is smaller than the width 410*h* of the part, of the flexion pin member 410, except the welded part 80. Since the welded part 80 is formed by melting of the end part 412*e* of the second straight pin member 412 and the end part 410*e* of the flexion pin member 410, a maximum width of the welded part 80 sometimes becomes larger than the width 412*h* of the part, of the second straight pin member 412, except the welded part 80 and larger than the width 410*h* of the part, of the flexion pin member 410, except the welded part 80. As can be appreciated from FIG. 6B, a width W1 of a portion of the welded part 80 of the second straight pin member 412 (e.g., a first pin member) is larger than the width 412*h* of the part of the second straight pin member 412 and is smaller than a width W2 of a portion of the welded part 80 of the flexion pin member 410 (e.g., a second pin member).

With the above arrangement, since the width 412*h* of the part, of the second straight pin member 412, except the welded part 80 is smaller than the width 410*h* of the part, of the flexion pin member 410, except the welded part 80, it is possible to prevent the width of the welded part 80 from becoming too large. As described above, the welded part 80 can be formed to have a smaller width than a welded part 80 formed with a second straight pin member 412 and a flexion pin member 410 having the same diameter, the gaps between the neighboring turns of the first coil 41 can be made small, so that the inductor component 1 can be miniaturized. In particular, the core 3 has an oval shape (track shape); therefore, even when the welded parts 80 are arranged along the long axis (Y direction), it is possible to secure distances between neighboring turns 80 of the first coil 41.

Further, since the welded part 80 has the constricted part 81, it is possible to prevent the width of the welded part 80 from becoming too large. Note that in the case where the second straight pin member 412 having a small width and the flexion pin members 410 having a normal width (diameter) are welded to each other as described in the first embodiment, if the widths of the welded parts 80 do not become larger than the diameters of the flexion pin members 410, the distances between the second straight pin members 412 and 412 of the neighboring turns can be closer without constricted parts 81 of the welded parts 80.

As shown in FIG. 6C, the welded part 80 is formed in a triangular shape as viewed from the Y direction. Here, the triangular shape does not have to be a perfect triangular shape but includes a substantially triangular shape, which has an angle formed by a curved line or has a curved side. Specifically, as viewed from the Y direction, one side of the triangular shape is positioned in the reverse Z direction, and one angle of the triangular shape is positioned in the forward Z direction. The welded part 80 preferably has a conical shape.

With this arrangement, since the welded part 80 is formed in a triangular shape, and the welded part 80 cannot be formed in a spherical shape, so that the welded part 80 can be made smaller, and the gaps between the neighboring turns of the first coil 41 can be made smaller, so that the inductor component 1 can be miniaturized.

As viewed from the Y direction, a region, of the welded part 80, at the end part 412*e* of the second straight pin member 412 (hereinafter, the region is referred to as a first region 80*a*) is larger than a region, of the welded part 80, at the end part 410*e* of the flexion pin member 410 (hereinafter, the region is referred to as a second region 80*b*). A boundary between the first region 80*a* and the second region 80*b* is the boundary shown by the imaginary line between the end face 412*f* and the peripheral surface 410*f* before welding.

With this arrangement, since the first region 80*a* is larger than the second region 80*b*, an amount of the welded part 80 provided on the end part 410*e* of the flexion pin member 410 can be reduced. It is therefore possible to reduce cases where the welded part 80 is provided on the outer side edge 410*i* side of the flexion pin member 410, so that the welded part 80 can be made smaller, and the gaps between the neighboring turns of the first coil 41 can be made smaller, whereby the inductor component 1 can be miniaturized. In addition, since it is possible to make the welded part 80 bigger on the second straight pin member 412 side, where the width is smaller, it is possible to prevent the welded part 80 from becoming large on the flexion pin member 410 side, where the width is larger.

The welded part 80 is provided on the entire peripheral surface of the end part 412*e* of the second straight pin member 412. Therefore, it is possible to firmly connect the end part 412*e* of the second straight pin member 412 and the end part 410*e* of the flexion pin member 410.

As shown in FIG. 4, the inductor component 1 preferably has a coating member 90 (shown by imaginary lines) covering a part of the first coil 41 and the second coil 42. Specifically, the coating member 90 covers the conductor parts 411*a*, 412*a*, and 410*a*, of the first coil 41, exposed from the coating films 410*b* and covers the conductor parts 421*a*, 422*a*, and 420*a*, of the second coil 42, exposed from coating film 420*b*. In other words, the coating member 90 covers the first and second straight pin members 411, 412, 421, and 422 (corresponding to the first pin members) and also covers the welded parts 80. As a material for the coating member 90, a thermosetting epoxy-based resin can be used, for example.

By providing the coating member 90 as described above, it is possible to prevent a change in position of the first coil 41 and the second coil 42. Further, since the coating member 90 covers the straight pin members 411, 412, 421, and 422, the straight pin members 411, 412, 421, and 422 can be isolated. Further, since the straight pin members 411, 412, 421, and 422 have a small width, bubbles generated when the coating member 90 is applied to the straight pin members 411, 412, 421, and 422 easily pass through the gaps between the straight pin members 411, 412, 421, and 422 of the neighboring turns, so that it is possible to prevent or reduce residual babbles in the coating member 90.

Method for Manufacturing an Inductor Component

Next, a method for manufacturing the inductor component 1 will be described.

As shown in FIG. 3, the first coil 41 and the second coil 42 are wound on the core 3 in which the insulation member 60 is fit, such that winding axes of the first coil 41 and the second coil 42 run parallel to each other. Specifically, the exposed conductor parts 411*a*, 412*a*, and 410*a* of the first coil 41 and the exposed conductor parts 421*a*, 422*a*, and

420*a* of the second coil 42 are disposed on the first end face 301 side of the core 3. Then, while the first end face 301 of the core 3 is directed upward, each pin member of the first coil 41 is welded, and each pin member of the second coil 42 is welded.

After that, as show in FIG. 4, the core 3 and the coils 41 and 42 are attached to the bottom plate part 21 and are then housed in the case 2, being covered with the lid part 22, whereby the inductor component 1 is manufactured.

By using the above-described manufacturing method, it is possible to reduce the number of steps of manufacturing the inductor component 1, and the inductor component 1 can therefore be manufactured more easily.

Next, a description will be made in more detail on how the first coil 41 and the second coil 42 wound on the core 3.

As shown in FIG. 6A, with respect to the neighboring second straight pin member 412 and flexion pin member 410, the end face 412*f* of the end part 412*e* of the second straight pin member 412 and the peripheral surface 410*f* of the end part 410*e* of the flexion pin member 410 are brought into contact with each other. In this step, the second straight pin member 412 and the flexion pin member 410 are disposed on the core 3 in a state where the width 412*h* of the end part 412*e* of the second straight pin member 412 is smaller than the width 410*h* of the end part 410*e* of the flexion pin member 410 as viewed from the Z direction.

The welded part 80 is formed, as shown in FIGS. 6B and 6C, by heating the neighboring second straight pin member 412 and flexion pin member 410 to mutually weld the end face 412*f* of the end part 412*e* of the second straight pin member 412 and the peripheral surface 410*f* of the end part 410*e* of the flexion pin member 410. The welding is performed by laser welding, but electron beam welding, TIG welding, or friction welding may be used.

In a case where fiber lase is used for welding, when a wire diameter of the pin member is, for example, 1.5 mm, the settings are as follows: a spot diameter of the laser is 0.1 mm; a fundamental wave of the laser is 1,064 nm; and a laser output is 800 W×100 ms=80 J.

By the above method, the welded part 80 is formed by welding the end part 412*e* of the second straight pin member 412 and the end part 410*e* of the flexion pin member 410 while the second straight pin member 412 and the flexion pin member 410 are disposed on the core 3 in a state where the width 412*h* of the end part 412*e* of the second straight pin member 412 is smaller than the width 410*h* of the end part 410*e* of the flexion pin member 410 as viewed in the Z direction. Therefore, the welded part 80 has the constricted parts 81, where the width is narrower as viewed from the Z direction. Therefore, it is possible to reduce protrusion of the welded part 80 in the gaps between the neighboring turns of the first coil 41, and the gaps between the neighboring turns of the first coil 41 can be made small, so that the inductor component 1 can be miniaturized.

Preferably, at the time of welding, a larger amount of heat is applied to the end part 412*e* of the second straight pin member than to the end part 410*e* of the flexion pin member 410. This prevents the welded part 80 from being provided on the outer side edge 410*i* of the flexion pin member 410 as viewed from the Y direction. In this way, it is possible to reduce a surface tension directed to the outer side edge 410*i* of the flexion pin member 410 while the welded part 80 is melted, so that the welded part 80 does not form such a spherical shape that covers the outer side edge 410*i*. Therefore, the welded part 80 can be made smaller, and the gap between the neighboring turns of the first coil 41 can be made smaller, so that the inductor component 1 can be miniaturized. In addition, it is possible to reduce protrusion of the welded part 80 beyond the outer side edge 410*i* of the flexion pin member 410, and an outer shape of the first coil 41 can be made small.

Specifically, on the flexion pin member 410, a surface tension is applied in such a manner that the molten metal will form a ball in the vertical direction to the surface of unmolten metal. Therefore, when the outer side edge 410*i* is not melted, the surface tension gathers the molten metal in the direction perpendicular to the molten surface, so that the molten metal moves toward the inner side direction rather than toward the outer side edge 410*i*. As a result, the welded part 80 is not provided on the outer side edge 410*i* of the flexion pin member 410.

In contrast, if the outer side edge 410*i* is melted, the molten metal gathers in a state where the molten metal protrudes beyond the outer side edge 410*i*. As a result, the welded part is provided on the outer side edge 410*i* of the flexion pin member 410.

The outer side edge 410*i* of the flexion pin member 410 has, as viewed from the Y direction, an endmost part 410*j* on the end face side of the end part 410*e* of the flexion pin member 410. The endmost part 410*j* is a part at which the outer side edge 410*i* intersects the end face of the end part 410*e*. The welded part 80 is preferably not provided at the endmost part 410*j* of the outer side edge 410*i* of the flexion pin member 410.

With this arrangement, it is possible to prevent or reduce the surface tension directed to the endmost part 410*j* of the outer side edge 410*i* of the flexion pin member 410 while the welded part 80 is melted, so that the welded part 80 does not form such a spherical shape that covers the outer side edge 410*i*. Specifically, in the case where the end face of the end part 410*e* of the flexion pin member 410 is heated to melt metal, if the endmost part 410*j* of the outer side edge 410*i* is not melted, molten metal does not expand to the outer side edge 410*i*.

Second Embodiment

Figure 7:
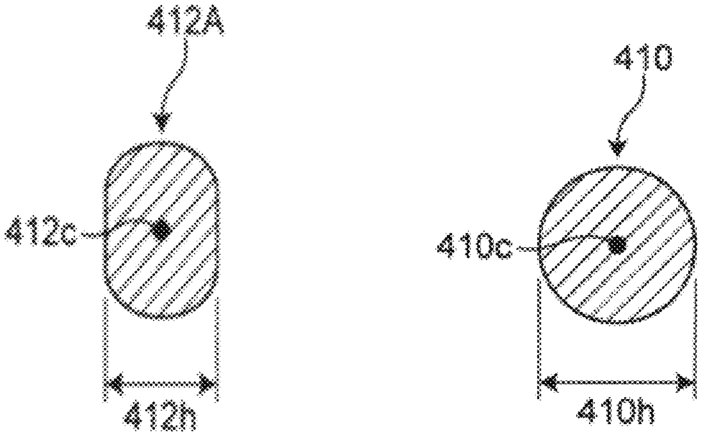
FIG. 7 is a cross-sectional view showing a second embodiment of the pin members.

FIG. 7 is a cross-sectional view showing a second embodiment of the pin members. In the second embodiment, the shape of the end part of the pin member is different from that in the first embodiment. This different component will be described below. The other components are the same as those in the first embodiment and are assigned the same reference signs, and the description is omitted.

As shown in FIG. 7, a cross-sectional area of a part, of a second straight pin member 412A, except the welded part 80 is equal to a cross-sectional area of a part, of the flexion pin member 410, except the welded part 80. The cross-sectional area of the flexion pin member 410 is the cross-sectional area on a plane orthogonal to a direction in which the flexion pin member 410 extends (in other words, orthogonal to the center line 410*c*), and a cross-sectional area of the second straight pin member 412A is the average cross-sectional area on a plane orthogonal to the direction in which the second straight pin member 412A extends (in other words, orthogonal to the center line 412*c*). A width 412*h* of the part, of the second straight pin member 412A, except the welded part 80 is smaller than a width 410*h* of the part, of the flexion pin member 410, except the welded part 80, and the cross-section of the second straight pin member 412A is an oval shape vertically longer in the Z direction. The second straight pin member 412A is formed in a shape having an oval cross-section, for example, by pressing a circular cross-sectioned pin member from the both sides.

With this arrangement, the cross-sectional area of the second straight pin member 412A is equal to the cross-sectional area of the flexion pin member 410; therefore, even when the width 412*h* of the part, of the second straight pin member 412A, except the welded part 80 is made small, increase in resistance of this part can be prevented or reduced.

Note that before the pin members are welded, the entire second straight pin member 412A may be formed in a shape having an oval cross-section, or only the end part of the second straight pin member 412A may be formed in a shape having an oval shape.

Note that the above description is also applied to the first straight pin members 411 and is also applied to the second coil 42 (pin members 420, 421, and 422).

Third Embodiment

Figure 8A:
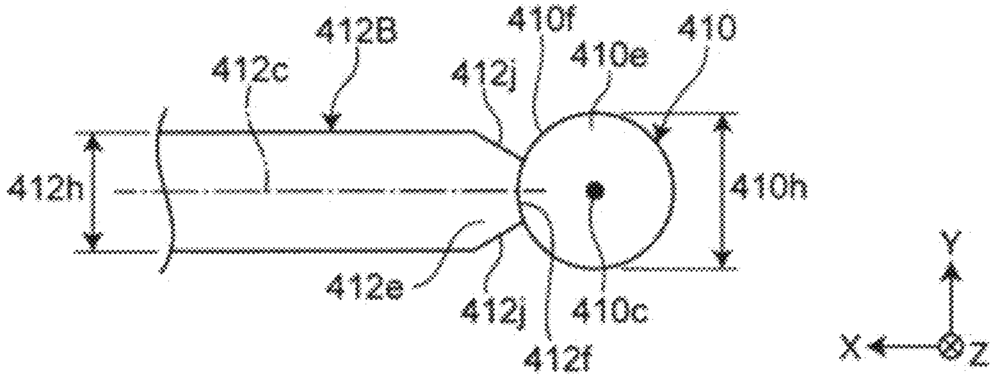
FIG. 8A shows a third embodiment of the method for manufacturing an inductor component and is a bottom view showing a state before welding.

FIG. 8A is a bottom view showing a third embodiment of the method for manufacturing an inductor component. In the third embodiment, the shape of the pin member is different from that in the first embodiment. This different component will be described below. The other components are the same as those in the first embodiment and are assigned the same reference signs, and the description is omitted.

As shown in FIG. 8A, with respect to the neighboring second straight pin member 412B and flexion pin member 410, the end face 412*f* of the end part 412*e* of the second straight pin member 412B and the peripheral surface 410*f* of the end part 410*e* of the flexion pin member 410 are brought into contact with each other. In this step, the second straight pin member 412B and the flexion pin member 410 are disposed on the core 3 in a state where the width of the end part 412*e* of the second straight pin member 412B is smaller, as viewed from the Z direction, toward the end face 412*f*. Specifically, the end part 412*e* of the second straight pin member 412B has tapered surfaces 412*j* each on one of the opposite sides in the Y direction. In this case, as viewed from the Z direction, the width 412*h* of the part, of the second straight pin member 412B, except a tapered surface 412*j* is smaller than the width 410*h* of the end part 410*e* of the flexion pin member 410.

In this case, the tapered surface 412*j* of the end part 412*e* of the second straight pin member 412B is formed to have an oval cross-section, for example, by pressing a circular cross-sectioned pin member from the both sides. With this arrangement, since the cross-sectional area of the end part 412*e* of the second straight pin member 412B is equal to the cross-sectional area of the second straight pin member 412B except the end part 412*e*, it is possible to prevent or reduce increase in the resistance of the end part 412*e* of the second straight pin member 412B.

Figure 8B:
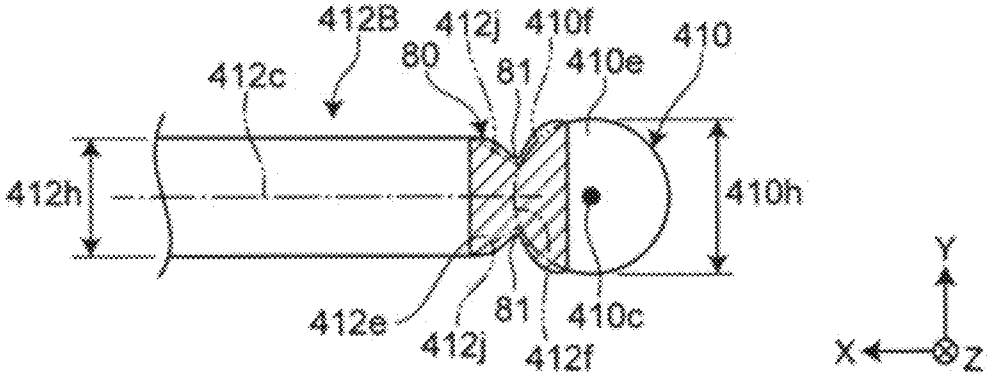
FIG. 8B shows the third embodiment of the method for manufacturing an inductor component and is a bottom view showing a state after welding.

After that, the welded part 80 is formed, as shown in FIG. 8B, by heating the neighboring second straight pin member 412B and flexion pin member 410 to mutually weld the end face 412*f* of the end part 412*e* of the second straight pin member 412B and the peripheral surface 410*f* of the end part 410*e* of the flexion pin member 410.

Since the welded part 80 is formed in this way, it is possible to further reduce protrusion of the welded part 80 in the gap between the neighboring turns of the first coil 41, and the gaps between the neighboring turns of the first coil 41 can be made smaller, so that the inductor component 1 can be miniaturized.

Note that the above description is also applied to the first straight pin members 411 and the flexion pin member 410 and is also applied to the second coil 42 (pin members 420, 421, and 422).

Note that the present disclosure is not limited to the above embodiments but can be changed in design without departing from the gist of the present disclosure. For example, the features of the respective first to third embodiments may be combined in various manners.

In the first to third embodiments, the welded part is not provided on the outer side edge of the flexion pin member as viewed from the Y direction; however, the welded part may be provided on the outer side edge of the flexion pin member.

In the first to third embodiments, the welded part is provided on the inner side with respect to the second plane as viewed from the Z direction; however, the welded part may be provided on the outer side with respect to the second plane as viewed from the Z direction.

In the first to third embodiments, the welded part has a constricted part as viewed from the Z direction, but the welded part does not have to have a constricted part.

In the first to third embodiments, the welded part has the constricted parts; however, the constricted parts may be provided on a part, of the end part of the flexion pin member, except the welded part. With this arrangement, the gap between the neighboring turns of the coil can be made small, and the size of the coil can therefore be small-sized, so that the inductor component can be miniaturized.

In the first to third embodiments, a straight pin member is used as the first pin member, a flexion pin member is used as the second pin member, and the first pin member and the second pin member integrally constitute one turn of the coil; however, each of the first pin member and the second pin member may constitute one turn of the coil. Alternatively, a plurality of first pin members and second pin members may constitute one turn of the coil. As described above, the shapes of the first pin member and the second pin member do not have to be an I-shape or a U-shape but may be a shape constituting one turn or may be shapes of divided pieces of one turn.

What is claimed is:

1. An inductor component comprising:

an annular core; and a coil wound on the core and including a plurality of turns, each of the turns including a first pin member and a second pin member, wherein a first one of the turns is next to a second one of the turns, and the first pin member of the first one of the turns and the second pin member of the second one of the turns have a welded part in which an end part of the first pin member and an end part of the second pin member are welded to each other, as viewed from a direction along a center line of the end part of the second pin member, a width of a part of the first pin member except the welded part is smaller than a width of a part of the second pin member except the welded part, and a width of a portion of the welded part of the first pin member is larger than a width of the part of the first pin member and is smaller than a width of a portion of the welded part of the second pin member.

2. The inductor component according to claim 1, wherein a cross-sectional area of the part of the first pin member except the welded part is equal to a cross-sectional area of the part of the second pin member except the welded part.

3. The inductor component according to claim 1, further comprising:

a coating member that covers the first pin member.

4. The inductor component according to claim 1, wherein the welded part is absent from an outer side edge of the second pin member as viewed from a direction orthogonal to a first plane containing a center line of the end part of the first pin member and the center line of the end part of the second pin member.

5. The inductor component according to claim 4, wherein as viewed from a direction along the center line of the end part of the second pin member, the welded part is provided on an inner side with respect to a second plane that is orthogonal to the first plane and contains the center line of the end part of the second pin member.

6. The inductor component according to claim 1, wherein the welded part has a constricted part whose width is narrower as viewed from a direction along the center line of the end part of the second pin member.

7. The inductor component according to claim 2, further comprising:

a coating member that covers the first pin member.

8. The inductor component according to claim 2, wherein the welded part is absent from an outer side edge of the second pin member as viewed from a direction orthogonal to a first plane containing a center line of the end part of the first pin member and the center line of the end part of the second pin member.

9. The inductor component according to claim 3, wherein the welded part is absent from an outer side edge of the second pin member as viewed from a direction orthogonal to a first plane containing a center line of the end part of the first pin member and the center line of the end part of the second pin member.

10. The inductor component according to claim 7, wherein the welded part is absent from an outer side edge of the second pin member as viewed from a direction orthogonal to a first plane containing a center line of the end part of the first pin member and the center line of the end part of the second pin member.

11. The inductor component according to claim 8, wherein as viewed from a direction along the center line of the end part of the second pin member, the welded part is provided on an inner side with respect to a second plane that is orthogonal to the first plane and contains the center line of the end part of the second pin member.

12. The inductor component according to claim 9, wherein as viewed from a direction along the center line of the end part of the second pin member, the welded part is provided on an inner side with respect to a second plane that is orthogonal to the first plane and contains the center line of the end part of the second pin member.

13. The inductor component according to claim 10, wherein as viewed from a direction along the center line of the end part of the second pin member, the welded part is provided on an inner side with respect to a second plane that is orthogonal to the first plane and contains the center line of the end part of the second pin member.

14. The inductor component according to claim 2, wherein the welded part has a constricted part whose width is narrower as viewed from a direction along the center line of the end part of the second pin member.

15. The inductor component according to claim 3, wherein the welded part has a constricted part whose width is narrower as viewed from a direction along the center line of the end part of the second pin member.

16. The inductor component according to claim 4, wherein the welded part has a constricted part whose width is narrower as viewed from a direction along the center line of the end part of the second pin member.

17. The inductor component according to claim 5, wherein the welded part has a constricted part whose width is narrower as viewed from a direction along the center line of the end part of the second pin member.

18. The inductor component according to claim 7, wherein the welded part has a constricted part whose width is narrower as viewed from a direction along the center line of the end part of the second pin member.

19. The inductor component according to claim 8, wherein the welded part has a constricted part whose width is narrower as viewed from a direction along the center line of the end part of the second pin member.

* * * * *